United States Patent
Mothersbaugh

(10) Patent No.: US 6,837,403 B2
(45) Date of Patent: Jan. 4, 2005

(54) HIGH PRESSURE ROTARY VALVE WITH SOUND REDUCTION MEANS

(75) Inventor: James E. Mothersbaugh, Muncy, PA (US)

(73) Assignee: The Young Industries, Inc., Muncy, PA (US)

( * ) Notice: Subject to any disclaimer, the term of this patent is extended or adjusted under 35 U.S.C. 154(b) by 103 days.

(21) Appl. No.: 10/224,419

(22) Filed: Aug. 21, 2002

(65) Prior Publication Data

US 2004/0035889 A1 Feb. 26, 2004

(51) Int. Cl.$^7$ ............................................. G01F 11/10
(52) U.S. Cl. ............................ 222/368; 222/481.5
(58) Field of Search ................................. 222/367, 368, 222/481.5

(56) References Cited

U.S. PATENT DOCUMENTS

| | | | |
|---|---|---|---|
| 5,765,728 A | * | 6/1998 | Simpson et al. ......... 222/146.2 |
| 6,045,009 A | * | 4/2000 | Beirle et al. ................ 222/368 |
| 6,206,247 B1 | * | 3/2001 | Ingram ...................... 222/368 |
| 6,237,816 B1 | * | 5/2001 | Boritzki ..................... 222/368 |
| 6,293,439 B1 | * | 9/2001 | Schleicher et al. ......... 222/368 |
| 6,338,423 B1 | * | 1/2002 | Polon ......................... 222/368 |

* cited by examiner

Primary Examiner—Joseph A. Kaufman
(74) Attorney, Agent, or Firm—Stevens, Davis, Miller & Mosher, LLP

(57) ABSTRACT

A rotary valve generally consisting of a housing having a cylindrical chamber provided with an inlet communicable with a zone of a first pressure, a first outlet communicable with a zone of a second pressure greater than said first pressure and a second outlet communicating with the exterior of said housing, a shaft journaled in the housing extending through and disposed coaxially relative to the axis of the chamber, a rotor mounted on the shaft within the chamber, between the inlet and each of the first and second outlets, having at least one set of circumferentially spaced material receiving pockets communicable sequentially with the inlet and the first outlet and the second outlet for receiving material through the inlet and discharging the material through the first outlet, and a device intercommunicating the second outlet and the exterior of the housing for diffusing the flow of gas vented from the rotor pockets through the second outlet to exterior of the housing to muffle the sound of venting gas.

9 Claims, 4 Drawing Sheets

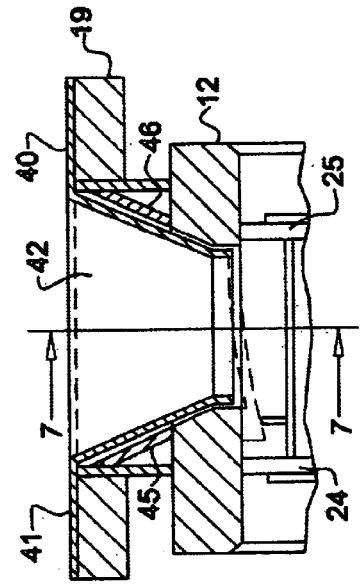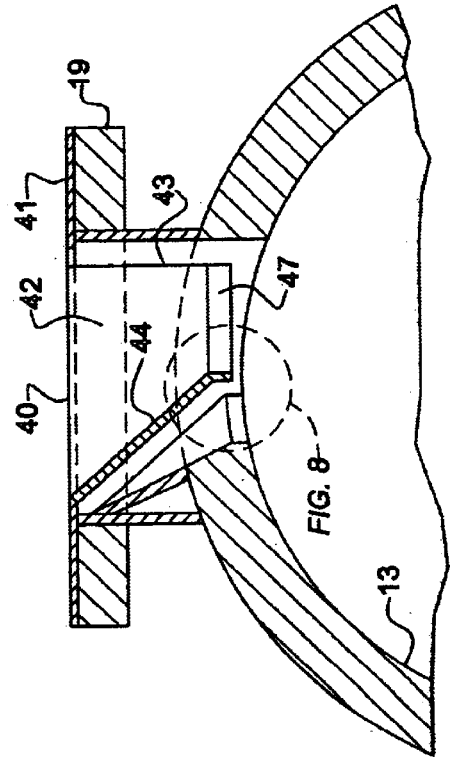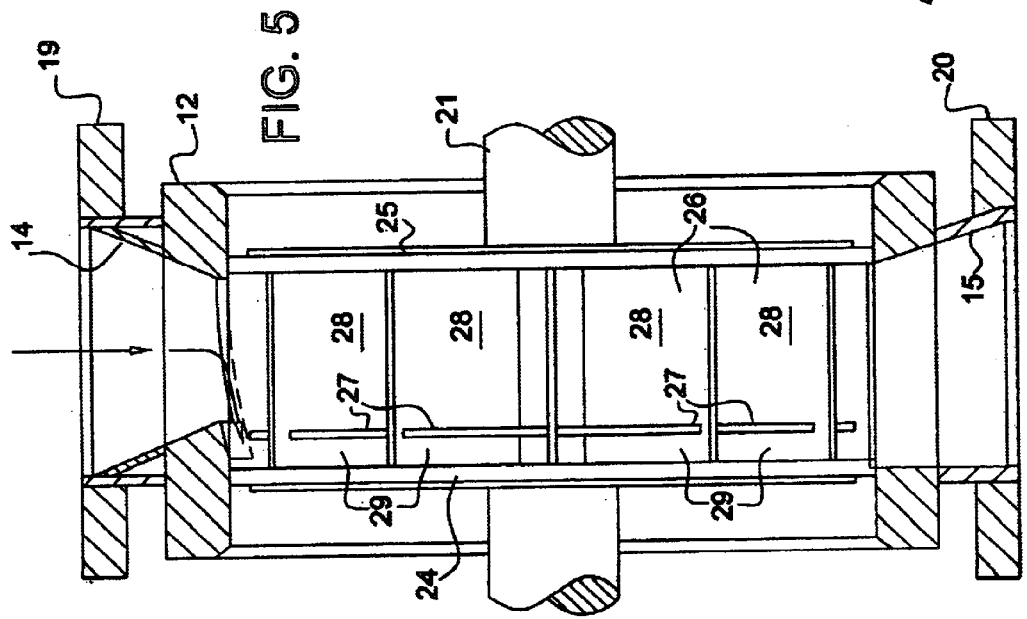

HIGH PRESSURE ROTARY VALVE WITH SOUND REDUCTION MEANS

This invention relates to high pressure rotary valve and more particularly to such valves having means for muffling the sound of exhaust gases vented therefrom.

BACKGROUND OF THE INVENTION

In the transfer of bulk particulate material from a vessel to a pneumatic conveying line, rotary valves commonly are used for feeding such material from the vessel to the conveying line. Often, the vessel is at atmospheric pressure so that material in the vessel is gravity fed through the valve to the conveying line in which air under pressure in the range of up to 60 psi is injected to convey material along the line. In some applications, depending on the nature of the material being handled, the vessel also may be pressurized. Under either of such circumstances, a pressure differential is provided across the valve.

Typically, rotary valves of the type described, generally includes a housing defining a cylindrical chamber having an inlet and an outlet, a shaft journaled in the housing, coaxially with the axis of the chamber, and a rotor mounted on the shaft within the chamber, having a plurality of circumferentially spaced pockets which function to receive material through the inlet of the valve and discharge such material through the outlet thereof as the rotor shaft is rotated. The positioning and rotation of the rotor of such valve function not only to pass material through the valve but to maintain the pressure differential across the valve. As pockets of the rotor of such valves communicate with the outlets thereof, discharging material therethrough, they become pressurized. In order for such valves to function properly to feed material therethrough, the pressures in such pockets must be relieved before they again communicate with the inlets of the valves. Such pressure relief commonly is accomplished by providing another outlet in the housing between the material discharge outlet and the material inlet for venting the pressurized air in such pockets to the atmosphere.

As pressurized air is vented from such valves, a high pitched, unpleasant sound is created which is highly objectionable and thus desirable to reduce if not eliminate. Accordingly, it is the principal object of the present invention to provide a high pressure rotary valve of the type described used for feeding bulk particulate materials from a comparatively low pressure zone to a high pressure zone, venting such valves and minimizing if not eliminating the objectionable sound created by the venting of high pressure air.

SUMMARY OF THE INVENTION

The present invention provides a high pressure rotary valve for feeding a bulk particulate material from a comparatively high pressure zone such as a vessel at atmospheric pressure to a high pressure zone such as a pneumatic conveying line in which such valve may be vented without incurring an objectionable sound, generally consisting of a housing having a cylindrical chamber provided with an inlet communicable with the low pressure zone, a first outlet communicable with the high pressure zone and a second outlet communicating with the exterior of the housing, a shaft journaled in the housing extending through and exposed coaxially with the axis of the chamber, a rotor mounted on the shaft within the chamber, between the inlet and each of the first and second outlets, having at least one set of circumferentially spaced, material receiving pockets communicable sequentially with the inlet, the first outlet and the second outlet for receiving material through the inlet and discharging the material through the first outlet, and means intercommunicating the second outlet and the exterior of the housing for diffusing the flow of gas from the pockets of the rotor through the second outlet to the exterior of the housing to muffle the sound of the exhausting gas.

BRIEF DESCRIPTION OF THE DRAWINGS

FIG. 5 is a cross sectional view taken along line 5—5 in FIG. 3;

FIG. 6 is an enlarged view of the upper portion shown in FIG. 5, incorporating the use of a baffle in the material inlet passageway;

FIG. 7 is a cross sectional view taken along line 7—7 in FIG. 6;

DETAILED DESCRIPTION OF THE PREFERRED EMBODIMENT OF THE INVENTION

Figure 1:
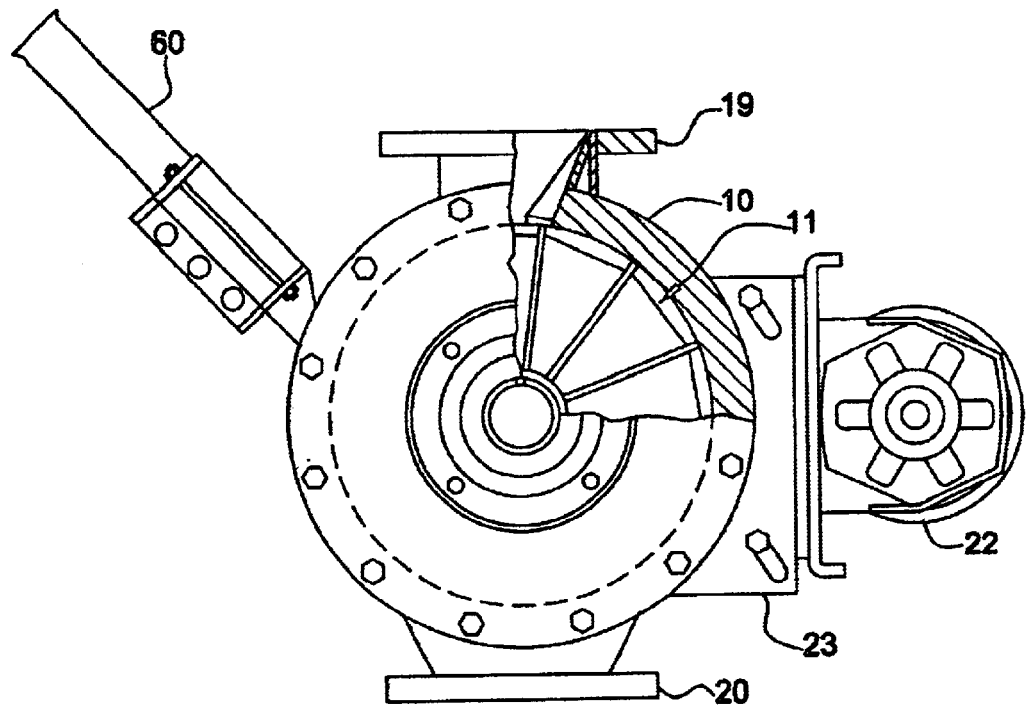
FIG. 1 is an end elevational view of a rotary valve embodying the present invention, having a portion thereof broken away to expose the material inlet passageway and the rotor thereof.
Figure 2:
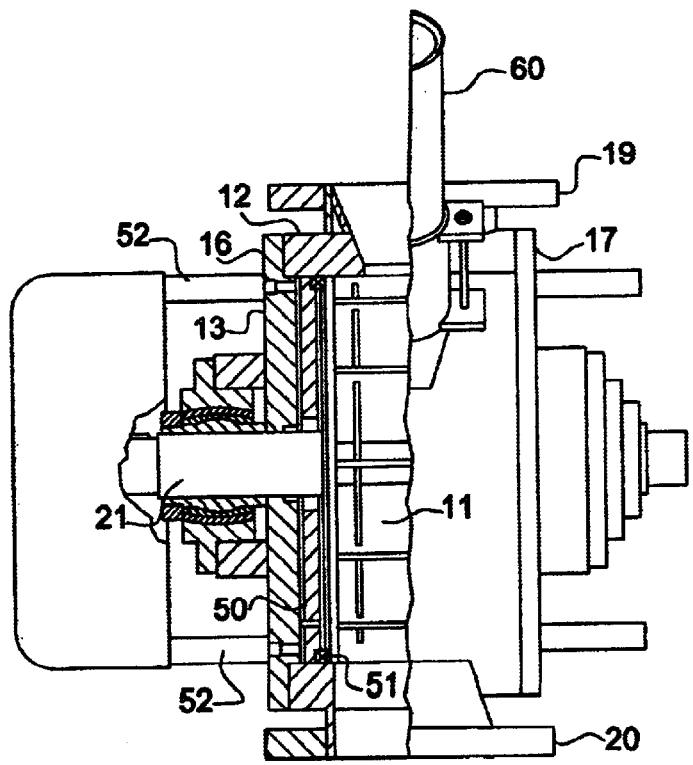
FIG. 2 is a side view of the embodiment shown in FIG. 1, having a portion thereof broken away to expose the material inlet and outlet passageways and the rotor thereof.
Figure 3:
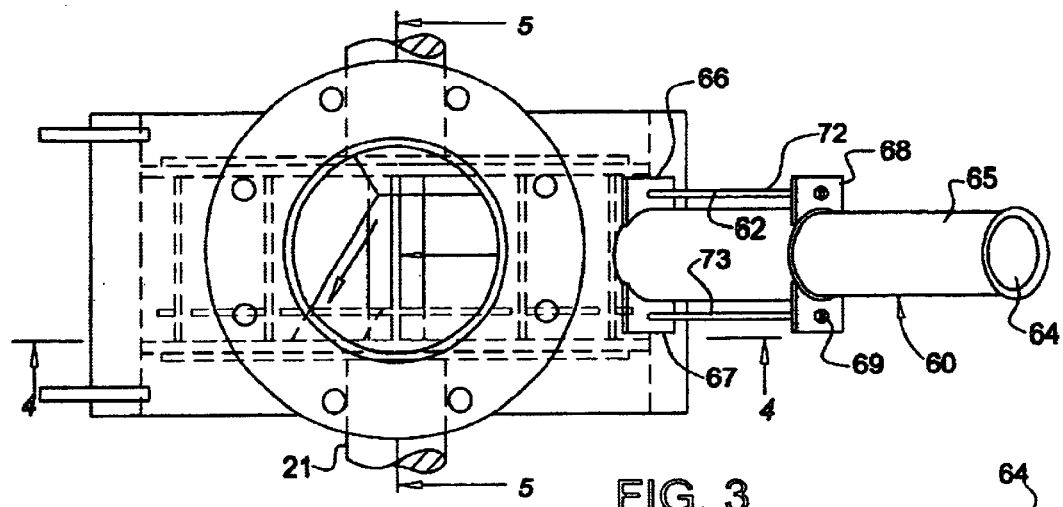
FIG. 3 is an enlarged, top view of the embodiment shown in FIGS. 1 and 2.
Figure 4:
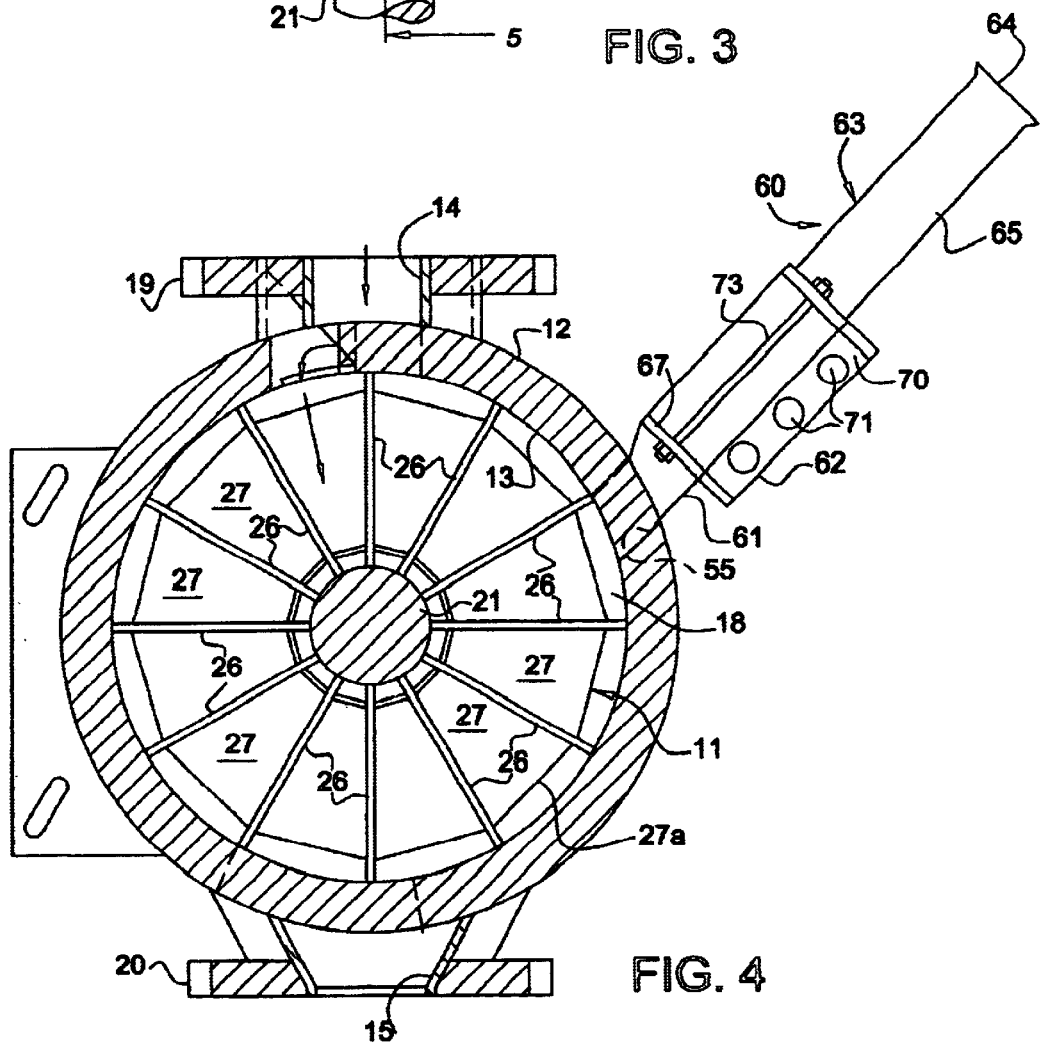
FIG. 4 is a cross sectional view taken along line 4—4 in FIG. 3.

Referring to FIGS. 1 through 5 and 9, there is illustrated a first embodiment of the invention which generally includes a housing 10 and rotor 11. The housing includes an annular member 12 having an inner, annular surface 13 and provided with material inlet and outlet passageways 14 and 15 disposed substantially 180° apart relative to the axis of annular wall 13, and a pair of end plates 16 and 17 bolted to the sides of the annular member to provide a cylindrical rotor chamber 18. As best seen in FIGS. 3 and 4, the rotor chamber is vented by means of a venting device 60 mounted on housing member 13 at an angular distance from the material inlet passageway, relative to the axis of the rotor chamber. Mounted on housing member 12 at opposite ends thereof and communicating with the material inlet openings 14 and 15, respectively, are connecting flanges 19 and 20. Flange 19 is adapted to be connected to an overhead vessel and the like for receiving gravity fed material therethrough. Flange 20 is adapted to be connected to a material receiving device such as a pneumatic conveying line for conveying material thereto.

Journaled in housing end plates, 16 and 17 and disposed coaxially relative to the rotor chamber is a rotor support shaft 21. Shaft 21 is adapted to be driven by a motor 22 mounted on a bracket 23 supported on the housing through a suitable gear reduction and a chain or belt drive. Rotor 11 is rigidly mounted on shaft 21 and includes a pair of parallel, axially spaced end walls or shrouds 24 and 25 and a plurality of circumferentially spaced, radially disposed vanes 26, as best seen in FIGS. 4 and 5. Spaced from rotor end walls 24 and 25, adjacent end wall 24 and secured to successive vanes 26 is a set of partition plates 27 which lie substantially in the same plane, spaced from and parallel to rotor end walls 24 and 25. The rotor shaft, the rotor end walls 24 and 25, the radially disposed vanes 26 and partition plates 27 define a first set of circumferentially spaced, material receiving pockets 28 and a second set of circumferentially spaced, material receiving pockets 29. As best shown in FIG. 5, material inlet opening 14 in housing member 12 is in radial alignment with only the set of pockets 28 so that material fed through inlet passageway 14 will be guided only into pockets 28, and outlet passageway 15 is in radial alignment with both sets of pockets 28 and 29 for receiving material from both sets of pockets 28 and 29. Also, as best shown in FIG. 4, the radial dimension of each of vanes 26 is slightly less than the radius of inner housing member wall 13 to permit clearance of the edges of the vanes relative to wall surface 13 for conveying material through the valve yet maintaining a pressure differential across the rotor, and the radial dimension of the outer edge 27a of each partition 27 is less than the radial dimension of each vane so that the outer ends of adjacent pockets 28 and 29 intercommunicate.

Figure 8:
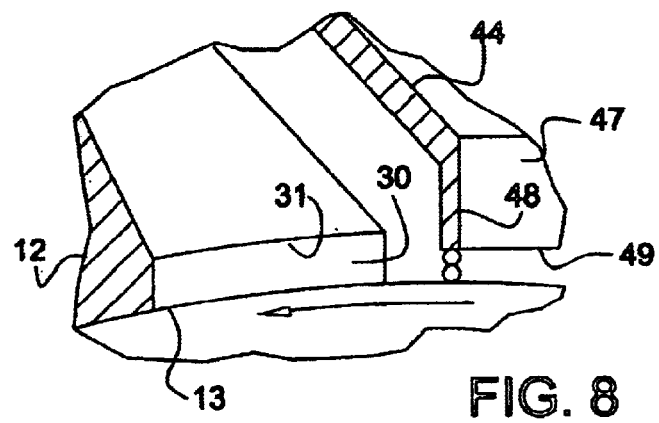
FIG. 8 is an enlarged fragmentary view of the portion of the valve shown in FIG. 7.
Figure 9:
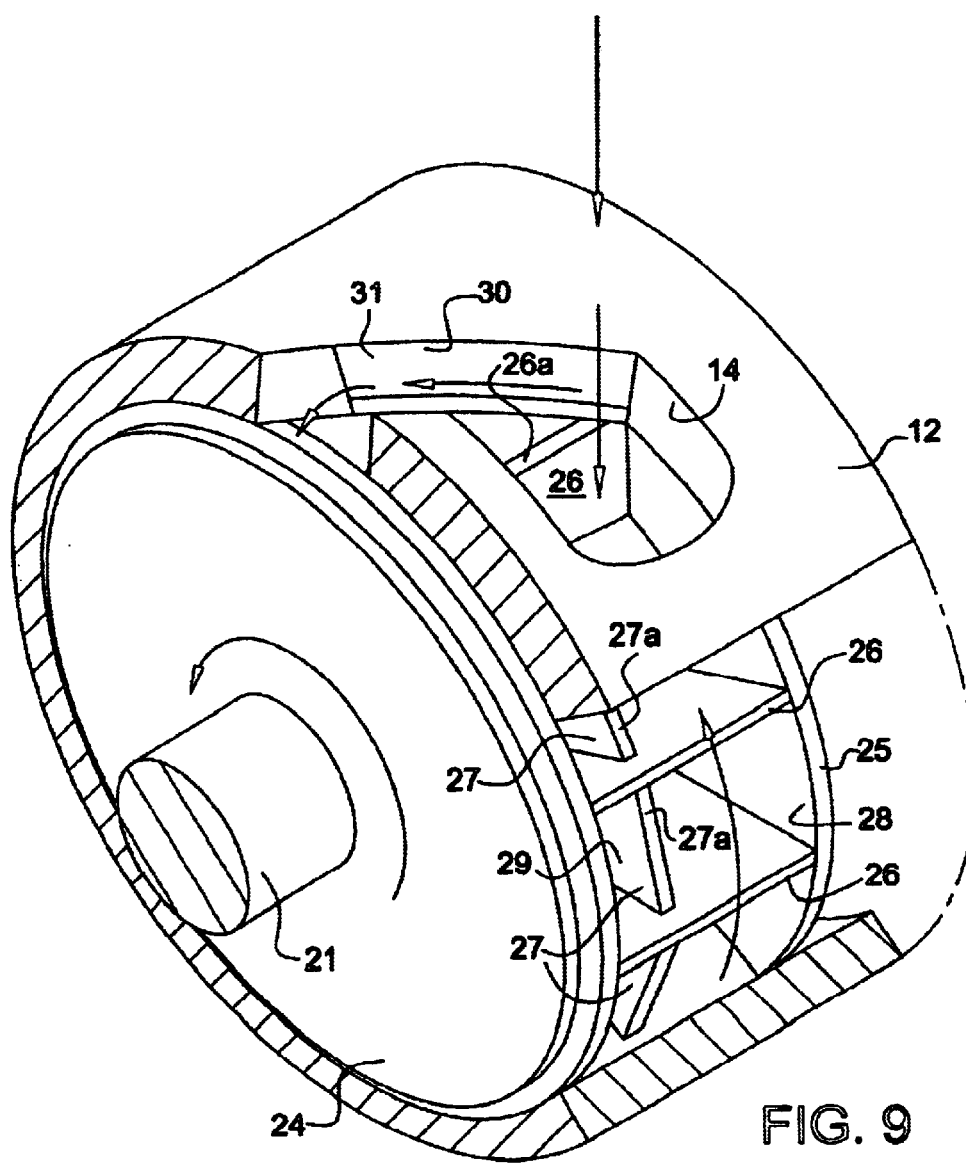
FIG. 9 is a perspective of the rotor and a portion of the housing of the embodiment shown in FIGS. 1 through 5, having portions of the housing broken away to illustrate the direct communication relationship of the pockets of a first set of pockets of the rotor with the material inlet passageway and the indirect communication relationship of the pockets of a second set of pockets with the material inlet passageway through the guide passageway of the valve.

Referring to FIGS. 8 and 9, a material guide passageway 30 is provided in cylindrical surface 13 of housing member 12 which intercommunicates the leading side of material inlet passageway 14 and the space between the planes of rotor end wall 24 and partition plates 27, leading to the second set of pockets 29. Guide passageway 30 is provided with a guide wall 31 which extends arcuately and laterally, at an angle to radially disposed vanes 26 to guide particles of materials fed through inlet passageway 14 and deposited on particles of materials filling pockets 28, circumferentially and laterally into pockets 29, from where they are conveyed through rotor chamber 18 and discharged through material outlet passageway 15. Because such overflow particles are guided in a circumferential and lateral direction into pockets 29, they are prevented from being pinched between vane edges 26a and cylindrical rotor chamber wall 13 to either shear or jam the valve. The bulk of material fed through the inlet passageway will be deposited in pockets 28 and conveyed through the rotor chamber to the outlet passageway. Those particles of material deposited on the particles filling pockets 28, otherwise likely to be pinched between the outer edges of vanes 26 and rotor chamber wall 13, will merely be guided into pockets 29. In this regard, it will be noted that the width or the dimension in the axial direction of material inlet passageway 14 is substantially the same as the width of pockets 28 and such inlet passageway is radially aligned with pockets 28 so that material fed through inlet passageway 14 will only be directly deposited in pockets 28 and not pockets 29 to accommodate the receipt of material through passageway 30 into pockets 29 which otherwise may be pinched between ends of vanes 26 and cylindrical rotor chamber wall 13, with the exception of a small amount of material which may flow from pockets 28 to pockets 29 in the small space between partition edges 27a and cylindrical rotor chamber wall 13.

To further assure against the pinching of particles between the ends of the vanes and the cylindrical chamber wall, and further provide for a smooth and uninterrupted flow of material through the valve, a baffle member 40 may be provided on flange 19, projecting into material inlet passageway 14. As best shown in FIGS. 6 though 8, the baffle member includes an annular section 41 adapted to rest on flange 19 and a funnel-shaped section 42 extending from the inner side of the annual flange section into passageway 14. The funnel-shaped section includes a substantially vertical, depending wall 43, a rearwardly-sloped front wall 44 and a pair of converging side walls 45 and 46, which converge together in a rectangular outlet portion 47 having a lower edge spaced a short distance from the annular plane defined by the path of travel of the outer edges of vanes 26 as they rotate. Funnel-shaped section 42 of the baffle is configured so that the front wall segment 48 of lower portion 47 is spaced from, yet adjacent to, passageway 30 and lower edge 49 is spaced from the path of the outer edges of vanes 26 a sufficient distance to allow the passage of the proper amount of material capable of being accommodated by passageway 31 for guiding excess material fed through inlet passageway 14 to pockets 29. The dimensions of guide passageway 31 and the spacing between lower edge 49 of the baffle and the path of the outer ends of vanes 26 may be sized to accommodate materials of different particle sizes.

The rotor may be sealed relative to the housing to maintain a pressure differential across the rotor by means of a sealing arrangement as shown in FIG. 2. The arrangement includes an annular follower plate 50 disposed on each side of the rotor between an end plate of the housing and an end wall of the rotor, an annular sealing gasket 51 mounted in a recess along the inner periphery of each follower plate which is adapted to engage cylindrical rotor chamber wall 13 and a rotor end wall, and a plurality of air actuated cylinders 52 which are operable to displace the follower plates axially toward the rotor and thus urge the sealing gaskets into sealing engagement with cylindrical rotor chamber wall 13 and the outer peripheral portions of the rotor side walls.

In the use of the valve as described, the valve may be operated either with or without a baffle member inserted in the inlet passageway. If a baffle member is to be used, one of a suitable configuration to accommodate a material of a particular particle size and composition is selected and installed in the inlet passageway. With the valve installed to meter or feed a particulate material, motor 22 is energized to rotate the rotor. As material is fed through the inlet passageway, it will deposit within pockets 28 and be conveyed through the valve and discharged through the outlet passageway. Excess material deposited on the material within pockets 28 will be caused to be advanced through guide passageway 30 where it will be diverted by guide wall 31 into pockets 29 which will convey such excess material through the valve and discharge it through the outlet passageway. As previously indicated, the baffle member will control the amount of excess material directed to and through the guide passageway to facilitate the flow of material through the valve. Excess air in the pockets will be vented through vent 18a as the pockets approach the inlet passageway.

As best shown in FIGS. 3 and 4, angular housing wall 12 is provided with a second outlet 55 which intercommunicates chamber 18 with the interior of venting device 60. Venting device 60 consists of a base section 61 rigidly connected or integrally formed by welding to housing wall 12 and having a passageway therethrough, a compression coupling 62 mounted on the base section and a cylindrical muffling member 63. Member 63 includes a closed end wall 64 and a cylindrical wall 65 consisting of a gas permeable material. The interior of muffling member 63 communicates with chamber 18 through the passageway in base section 61 and outlet 55.

Base section 61 essentially consists of a tube stub and is provided with a pair of radially disposed tabs 66 and 67. Cylindrical muffling member 63 similarly is provided with a pair of tabs 68 and 69. Compression coupling 62 is generally cylindrical and receives the mating ends of base section 61 and muffling member 63. It further is provided with a pair of radially projecting, mating tabs 70, 70 which may be secured together by means of a set of threaded members 71 to firmly clamp the cylindrical portion thereof to the mating ends of members 61 and 65. Such members further are held together by means of a pair of elongated, threaded rods 72 and 73 extending through openings in the tab portions of members 61 and 63 and provided with washers and nuts threaded on the ends thereof. The venting device may be assembled simply by mounting the compression coupling on member 61, mounting member 63 on the other open end of compression coupler 62 with tabs 68 and 69 longitudinally aligned with tabs 66 and 67, respectively, and then threading fasteners 71. Threaded rods 72 and 73 are then inserted in the aligned openings of the tabs, and the washers and nuts are applied on the ends of the rod members to draw the mating ends of members 61 and 63 together to provide an air tight coupling therebetween.

As rotor 11 rotates in a counter-clockwise direction relative to FIG. 4 and material fed through inlet 14 is carried in rotor pockets 28 and 29 and discharged through outlet 15, communication of such pockets with the high pressure zone communicating with outlet 15 will cause the air in rotor pockets 28 and 29 to become pressurized. As such pockets of pressurized air come into communication with outlet 55, such pressurized air will be exhausted through venting device 60. As such pressurized air passes through gas permeated wall 63, it becomes diffused and vented into the ambient atmosphere. Such diffusion has the effect of reducing or muffling the sound level of the exhausting gas thus rendering the operation of the valve at a reduced noise level.

Cylindrical wall 63 of the venting device may be formed of any gas permeable material functional to diffuse the flow of a high pressure gas therethrough to reduce the noise level. It may be formed of a sintered or laminated structure as is well known in the art. Preferably the muffling member of the venting device consist of an elongated, cylindrical member providing a maximum area for adequately diffusing the pressurized gas flowing therethrough. Such venting device further should have sufficient capacity to fully vent rotor pockets 28 and 29 to permit the free flow of material head through inlet 14 as the pockets advance into communication with such inlet.

The valve as described may be formed of any suitable metal including carbon steel, stainless steel and aluminum. The components will be cast and/or fabricated. To accommodate abrasive and corrosive materials, various lining materials such as TEFLON or special alloys may be used. Other materials such as plastic materials also may be used in the manufacture of the valves. In addition, other configurations of connecting flanges may be used to connect the valve to desired feeding and receiving components.

Rotary valves of the type described not only emit undesirable noise continuously but emit small particles of material. In the prior art, such emissions have been handled by hard piping the vent away from the valve to a silo or other enclosed vessel. The present invention eliminates such extensive and costly piping while effectively abating noise and particle pollution of the ambient environment.

From the foregoing detailed description it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A rotary valve comprising:

a housing having a cylindrical chamber provided with an inlet communicable with a zone of a first pressure, a first outlet communicable with a zone of a second pressure greater than said first pressure and a second outlet communicating with the exterior of said housing;

a shaft journaled in said housing extending through and disposed coaxially relative to said chamber;

a rotor mounted on said shaft within said chamber, between said inlet and each of said first and second outlets, having at least one set of circumferentially spaced material receiving pockets communicable sequentially with said inlet, said first outlet and said second outlet for receiving material through said inlet and discharging said material through said first outlet;

means intercommunicating said second outlet and the exterior of said housing for diffusing the flow gas vented from said pockets through said second outlet to the exterior of said housing to muffle the sound of venting gas, said diffusing means including a gas permeable wall through which said gas vented through said second outlet traverses.

2. A rotary valve according to 1 wherein said wall is cylindrical.

3. A rotary valve according to claim 2 wherein said cylindrical wall is elongated.

4. A rotary valve according to claim 1 wherein said second outlet is in a cylindrical wall of said chamber.

5. A rotary valve according to claim 1 wherein said inlet and outlets are radially disposed relative to the axis of said chamber.

6. A rotary valve according to claim 5 wherein said second outlet is disposed between said inlet and said first outlet in a down stream direction from said first outlet.

7. A rotary valve according to claim 6 wherein said inlet and said first outlet are displaced 180.degree. relative to the axis of said chamber.

8. A rotary valve according to claim 1 wherein said rotor includes first and second sets of circumferentially spaced material receiving pockets communicable with said inlet and outlets for receiving material through said inlet, discharging said material through said first outlet and venting gas under pressure therein through said second outlet.

9. A rotary valve according to claim 8 including a baffle disposed is said inlet for diverting material received through said inlet and not deposited within said first set of pockets, into said second set of pockets.

* * * * *